(12) United States Patent
Cai et al.

(10) Patent No.: US 11,196,592 B1
(45) Date of Patent: Dec. 7, 2021

(54) EQUALIZER WITH PERTURBATION EFFECT BASED ADAPTATION

(71) Applicant: Credo Technology Group Limited, Grand Cayman (KY)

(72) Inventors: Fang Cai, Milpitas, CA (US); Junqing (Phil) Sun, Fremont, CA (US); Haoli Qian, Fremont, CA (US)

(73) Assignee: Credo Technology Group Limited, Grand Cayman (KY)

( * ) Notice: Subject to any disclaimer, the term of this patent is extended or adjusted under 35 U.S.C. 154(b) by 0 days.

(21) Appl. No.: 16/937,773

(22) Filed: Jul. 24, 2020

(51) Int. Cl.
*H03K 5/159* (2006.01)
*H04L 25/03* (2006.01)

(52) U.S. Cl.
CPC ............. *H04L 25/03057* (2013.01); *H04L 2025/0349* (2013.01)

(58) Field of Classification Search
CPC .......... H04L 25/03057; H04L 2025/0349
USPC ............................................. 375/229
See application file for complete search history.

(56) References Cited

U.S. PATENT DOCUMENTS

| | | | |
|---|---|---|---|
| 7,426,236 B1 * | 9/2008 | He | H04L 25/03057 375/232 |
| 7,764,732 B2 * | 7/2010 | Rollins | H04L 25/03057 375/233 |
| RE42,021 E * | 1/2011 | Pollmann | H04L 1/0036 375/222 |
| 2002/0154688 A1 * | 10/2002 | Pollmann | H04L 27/0012 375/229 |
| 2009/0268802 A1 * | 10/2009 | Wang | H04L 25/03057 375/233 |
| 2014/0241477 A1 * | 8/2014 | Eliaz | H04L 1/005 375/348 |

OTHER PUBLICATIONS

Wikipedia "Least mean squares filter" retrieved https://en.wikipedia.org/wiki/Least_mean_squares_filter, Feb. 21, 2020.
U.S. Appl. No. 16/920,115 "Decision Feedback Equalizer with Fractional Tap Unrolling" Junqing (Phil) Sun.

* cited by examiner

*Primary Examiner* — Helene E Tayong
(74) *Attorney, Agent, or Firm* — Ramey & Schwaller LLP

(57) ABSTRACT

Equalization methods and equalizers employing discrete-time filters are provided with dynamic perturbation effect based adaptation. Tap coefficient values may be individually perturbed during the equalization process and the effects on residual ISI monitored to estimate gradient components or rows of a difference matrix. The gradient or difference matrix components may be assembled and filtered to obtain components suitable for calculating tap coefficient updates with reduced adaptation noise. The dynamic perturbation effect based updates may be interpolated with precalculated perturbation effect based updates to enable faster convergence with better accommodation of analog component performance changes attributable to variations in process, supply voltage, and temperature.

18 Claims, 4 Drawing Sheets

Fig. 6
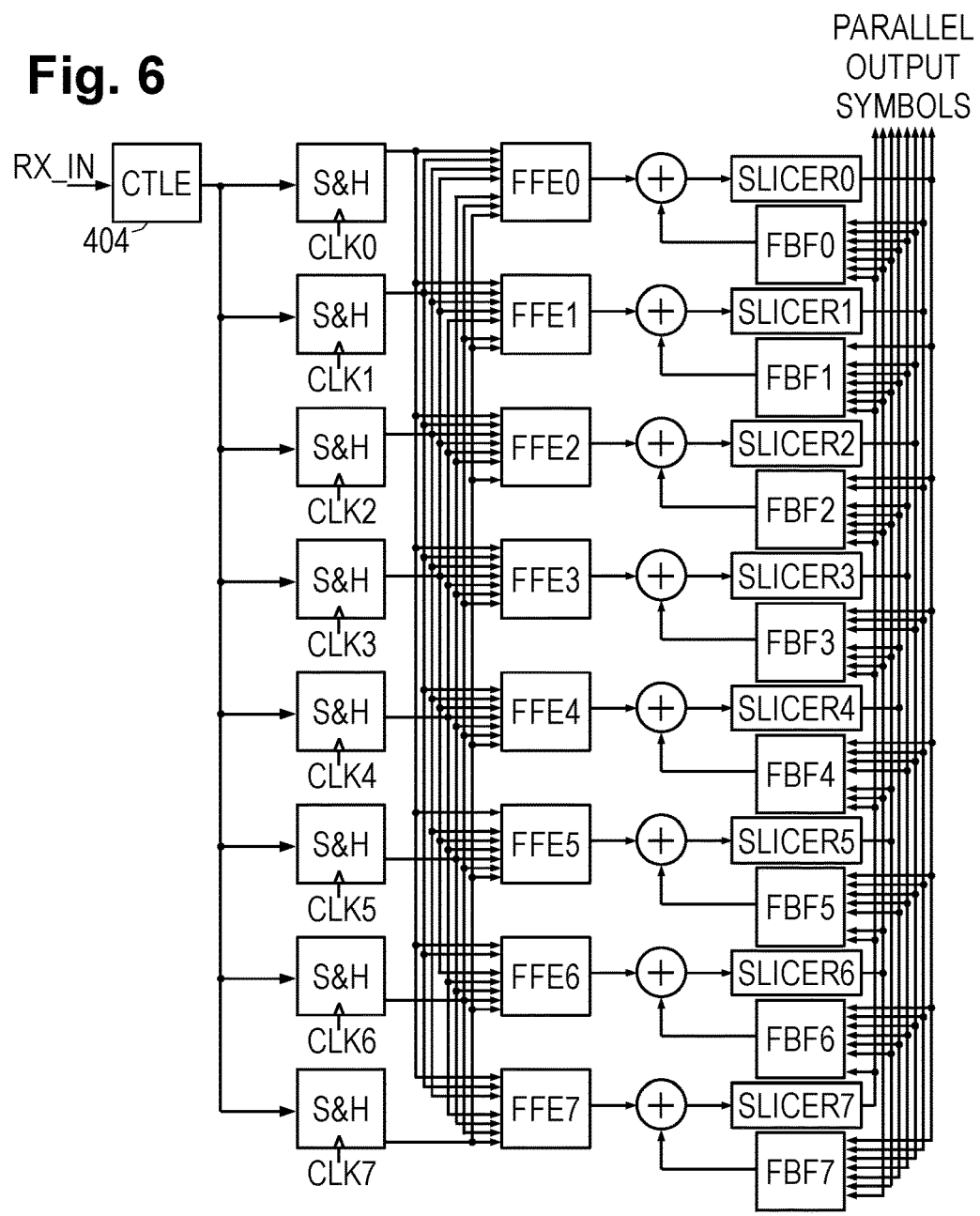
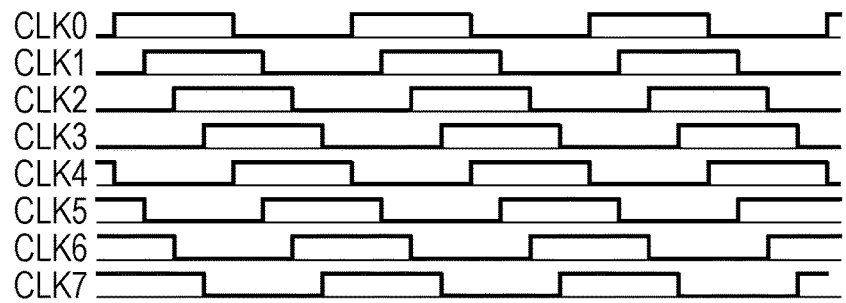
Fig. 7

EQUALIZER WITH PERTURBATION EFFECT BASED ADAPTATION

BACKGROUND

Digital communications occur between sending and receiving devices over an intermediate communications medium, or "channel" (e.g., a fiber optic cable or insulated copper wires). Each sending device typically transmits symbols at a fixed symbol rate, while each receiving device detects a (potentially corrupted) sequence of symbols and attempts to reconstruct the transmitted data. A "symbol" is a state or significant condition of the channel that persists for a fixed period of time, called a "symbol interval". A symbol may be, for example, an electrical voltage or current level, an optical power level, a phase value, or a particular frequency or wavelength. A change from one channel state to another is called a symbol transition. Each symbol may represent (i.e., encode) one or more binary bits of the data. Alternatively, the data may be represented by symbol transitions, or by a sequence of two or more symbols.

Many digital communication links use only one bit per symbol; a binary '0' is represented by one symbol (e.g., an electrical voltage or current signal within a first range), and binary '1' by another symbol (e.g., an electrical voltage or current signal within a second range), but higher-order signal constellations are known and frequently used. In 4-level pulse amplitude modulation ("PAM4"), each symbol interval may carry any one of four symbols, denoted as −3, −1, +1, and +3. Two binary bits can thus be represented by each symbol.

Channel non-idealities produce dispersion which may cause each symbol to perturb its neighboring symbols, a consequence termed "inter-symbol interference" ("ISI"). ISI can make it difficult for the receiving device to determine which symbols were sent in each interval, particularly when such ISI is combined with additive noise.

To combat noise and ISI, receiving devices may employ various equalization techniques. Linear equalizers generally have to balance between reducing ISI and avoiding noise amplification. Decision Feedback Equalizers ("DFE") are often preferred for their ability to combat ISI without inherently amplifying the noise. As the name suggests, a DFE employs a feedback path to remove ISI effects derived from previously-decided symbols. Other equalizer designs are also known. As symbol rates continue to increase, whichever equalizer is used must contend with ever-increasing levels of ISI, and must complete their processing in ever-decreasing symbol intervals. To make the situation even more challenging, the chosen equalizer design must cope with potential changes in performance of its components due to process variation, supply voltage variation, and temperature variation (collectively, "PVT variations").

SUMMARY

Accordingly there are disclosed herein equalization methods and equalizers employing discrete-time filters with perturbation-effect based adaptation. One illustrative equalizer includes at least: a discrete-time, finite impulse response ("FIR") filter to convert an input signal to a filtered signal; a decision element to determine channel symbols represented by the filtered signal; an error module to measure, based in part on the channel symbols, residual intersymbol interference ("ISI") associated with the filtered signal; and an adaptation module to determine dynamic effects of filter tap coefficient perturbations on the residual ISI and to determine updates for tap coefficients of the filter based on the dynamic effects.

The associated equalization method includes at least: converting an input signal to a filtered signal using a discrete-time, finite impulse response ("FIR") filter; using a decision element to determine channel symbols represented by the filtered signal; measuring, based in part on the channel symbols, residual intersymbol interference ("ISI") associated with the filtered signal; perturbing tap coefficients of the filter to determine dynamic effects on the residual ISI; and updating the tap coefficients based on the dynamic effects.

For a device manufacturer, the equalization method may include: providing a discrete-time, finite impulse response ("FIR") filter to convert an input signal to a filtered signal; configuring a decision element to determine channel symbols represented by the filtered signal; coupling the channel symbols to an error module to measure residual intersymbol interference ("ISI") associated with the filtered signal; and providing an adaptation module to determine dynamic effects of filter tap coefficient perturbations on the residual ISI and to derive updates for tap coefficients of the filter from the dynamic effects.

Each of the foregoing equalizers and equalization methods may be implemented individually or conjointly, together with any one or more of the following features in any suitable combination: 1. the adaptation module determines the tap coefficient updates by combining the dynamic effects with precalculated effects of filter tap coefficient perturbations on the residual ISI. 2. the adaptation module iterates systematically through the tap coefficients to determine the dynamic effect associated with each individual tap coefficient. 3. the perturbations include upward perturbations and downward perturbations. 4. each of the updates combines the dynamic effect associated with an upward perturbation of a given tap coefficient with the dynamic effect associated with a downward perturbation of that given tap coefficient. 5. the dynamic effects are determined as a combination of a current and previous estimates. 6. the adaptation module determines the dynamic effects using a recursive forgetting factor. 7. the adaptation module is configured to derive a perturbation-based error gradient estimate from the effects. 8. the decision element includes a decision feedback precompensation unit. 9. a feedback filter to convert the channel symbols into a feedback signal. 10. a summer that combines the feedback signal with the filtered signal to provide the decision element with an equalized signal. 11. the dynamic effects are expressible as a vector or matrix of differences in residual ISI measurements. 12. the dynamic effects are expressible as a vector of differences in residual ISI energy measurements.

BRIEF DESCRIPTION OF THE DRAWINGS

FIG. 6 is a block diagram of an illustrative parallel DFE.

FIG. 7 is a clock signal timing diagram for the parallelized DFE.

DETAILED DESCRIPTION

Figure 1:
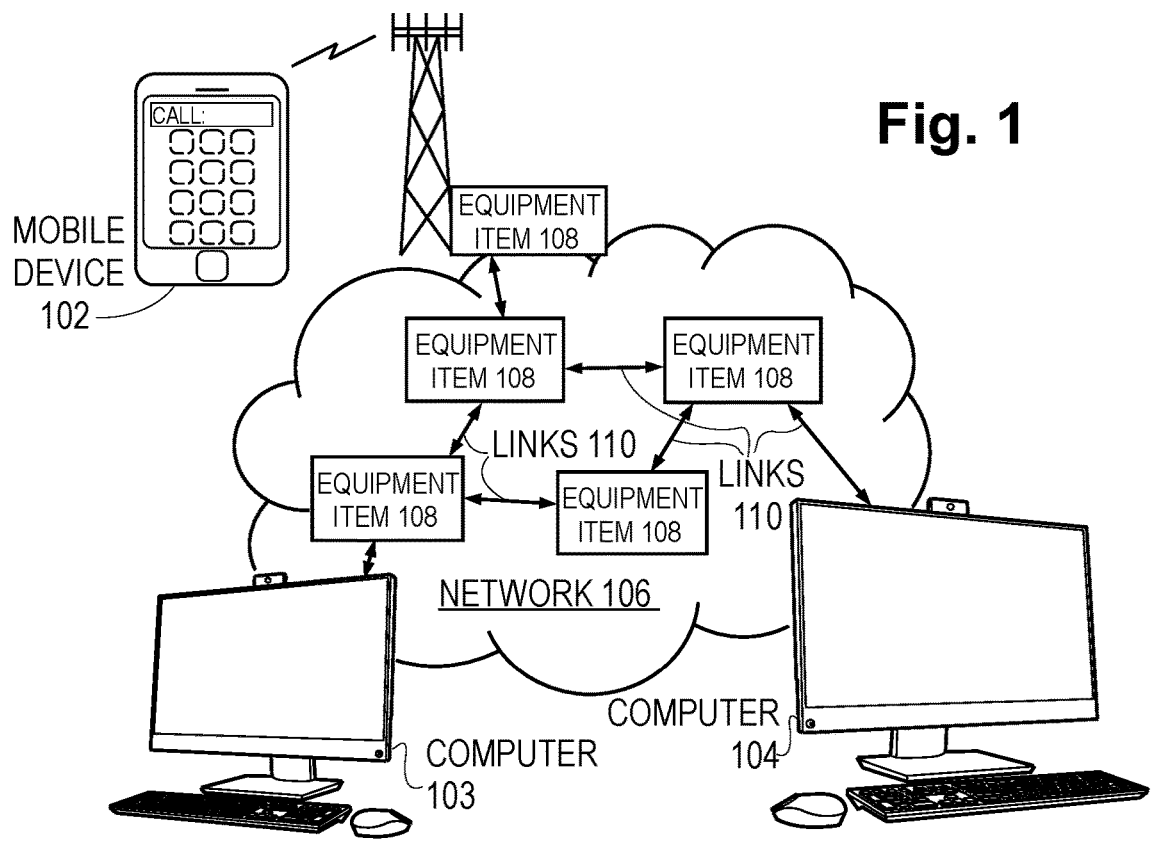
FIG. 1 shows an illustrative computer network.

Note that the specific embodiments given in the drawings and following description do not limit the disclosure. On the contrary, they provide the foundation for one of ordinary skill to discern the alternative forms, equivalents, and modifications that are encompassed in the claim scope.

The disclosed equalizers and equalization methods are best understood in the context of the larger environments in which they operate. Accordingly, FIG. 1 shows an illustrative communications network including a mobile device 102 and computer systems 103-104 coupled via a packet-switched routing network 106. The routing network 106 may be or include, for example, the Internet, a wide area network, or a local area network. In FIG. 1, the routing network 106 includes a network of equipment items 108, such as hubs, switches, routers, bridges, and the like. The equipment items 108 are connected to one another, and to the computer systems 103-104, via point-to-point communication links 110 that transport data between the various network components.

Figure 2:
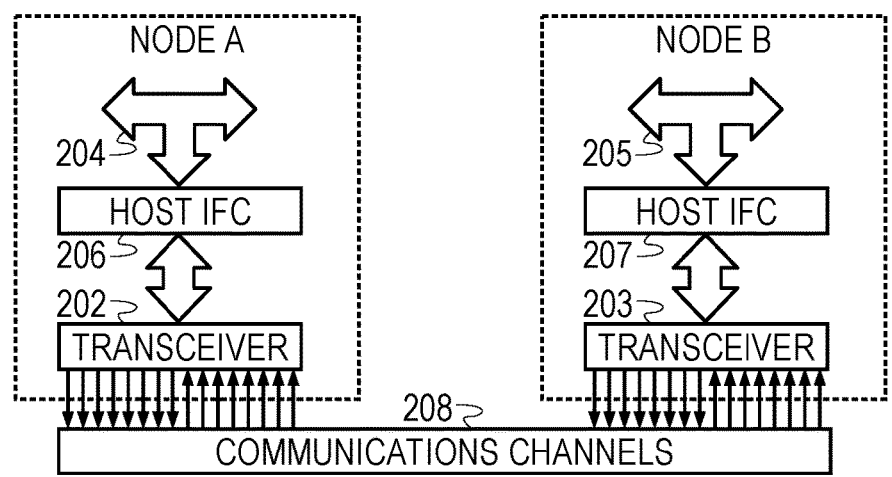
FIG. 2 is a block diagram of an illustrative point-to-point communication link.

FIG. 2 is a diagram of an illustrative point-to-point communication link that may be representative of links 110 in FIG. 1. The illustrated embodiment includes a first node ("Node A") in communication with a second node ("Node B"). Nodes A & B can each be, for example, any one of mobile devices 102, equipment items 108, computer systems 103-104, or other sending/receiving devices suitable for high-rate digital data communications.

Node A includes a transceiver 202 coupled to Node A's internal data bus 204 via a host interface 206. Similarly, Node B includes a transceiver 203 coupled to its internal bus 205 via a host interface 207. Data transfers internal to the nodes may occur via, e.g., parallel 64 or 128 bit buses. When data blocks need to be conveyed to or from a remote destination, the host interfaces 206, 207 may convert between internal data formats and network packet formats, and may provide packet sequencing and buffering for the transceivers. The transceivers 202, 203 serialize the packets for transmission via high-bandwidth communications channels 208, and process receive signals to extract the transmitted data.

The communication channels 208 extend between the transceivers 202, 203. The channels 208 may include, for example, transmission media such as fiber optic cables, twisted pair wires, coaxial cables, backplane transmission lines, and wireless communication links. (It is also possible for the channels to be formed by a magnetic or optical information storage medium, with the write-read transducers serving as transmitters and receivers.) Bidirectional communication between Node A and Node B can be provided using separate unidirectional channels, or in some circumstances, a single channel that transports signals in opposing directions without interference. The channel signal may be, for example, an electrical voltage, an electrical current, an optical power level, a wavelength, a frequency, a phase value, or any suitable attribute of energy that passes from the beginning of the channel to its terminus. The transceivers include receivers that process the received channel signals to reconstruct the transmitted data.

Figure 3:
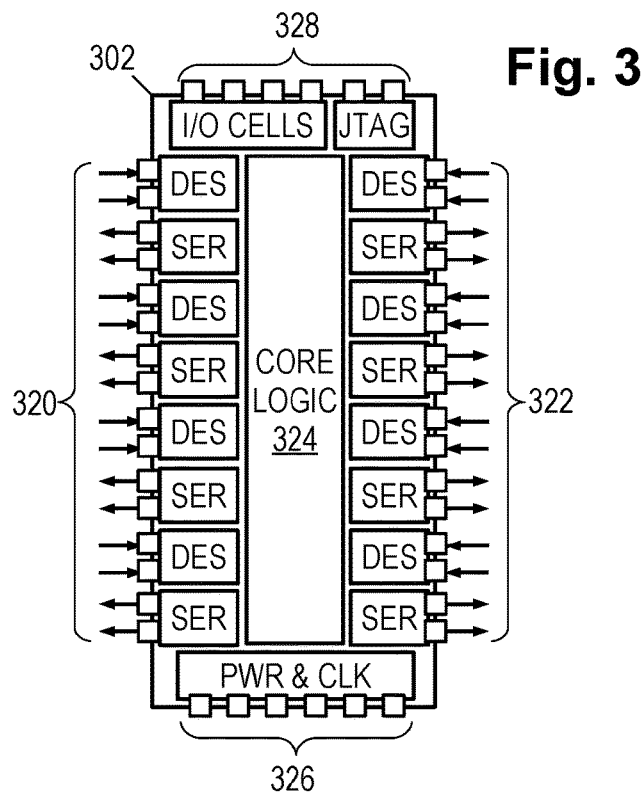
FIG. 3 is a block diagram of an illustrative serializer-deserializer transceiver.

FIG. 3 shows an illustrative monolithic transceiver chip 302. Chip 302 includes SerDes modules with contacts 320 for receiving and transmitting high-rate serial bitstreams across eight lanes of a communication channel 208, additional SerDes modules with contacts 322 for conveying the high-rate serial bitstreams to the host interface 206, and core logic 324 for implementing a channel communications protocol while buffering bitstreams between the channel and host interface. Also included are various supporting modules and contacts 326, 328, such as power regulation and distribution, clock generation, digital input/output lines for control signals, and a JTAG module for built-in self testing.

The "deserializer" implements the receiving function of the chip 302, implementing decision feedback equalization ("DFE") or any other suitable equalization technique that may employ a discrete-time finite impulse response ("FIR") filter with adjustable tap coefficients, e.g., linear equalization, partial response equalization. At the contemplated symbol rates (above 50 Gbd), the chosen equalizer operates under severe timing constraints.

Figure 4:
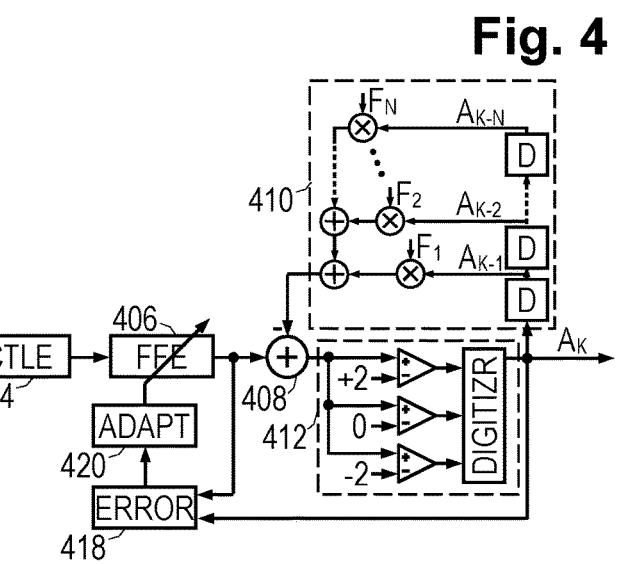
FIG. 4 is a block diagram of an illustrative decision feedback equalizer ("DFE").

FIG. 4 shows an illustrative implementation of a DFE configured for receiving PAM4 signals. An optional continuous time linear equalization ("CTLE") filter 404 provides analog filtering to bandlimit the signal spectrum while optionally boosting high-frequency components of the receive signal RX_IN. A feed-forward equalization ("FFE") filter 406 minimizes leading inter-symbol interference ("ISI") while optionally reducing the length of the channel impulse response. A summer 408 subtracts a feedback signal, provided by feedback filter 410, from the filtered signal provided by the FFE filter 406 to produce an equalized signal in which the effects of trailing ISI have been minimized. A decision element 412, sometimes called a "slicer", operates on the equalized signal to determine which symbol it represents in each symbol interval. The resulting stream of symbol decisions is denoted $A_k$, where k is the time index.

In the illustrated example, the symbols are presumed to be PAM4 (−3, −1, +1, +3), so the comparators employed by decision element 412 use the decision thresholds −2, 0, and +2, respectively. (The unit for expressing symbol and threshold values is omitted for generality, but for explanatory purposes may be presumed to be volts.) The comparator outputs can be taken collectively as a thermometer-coded digital representation of the output symbol decision, or a digitizer may optionally be used to convert the comparator outputs into a binary number representation, e.g., 00 to represent −3, 01 to represent −1, 10 to represent +1, and 11 to represent +3. Alternatively, a Gray-coded representation could be employed.

The DFE generates the feedback signal with a feedback filter 410 having a series of delay elements D (e.g., latches, flip flops, or shift registers) that store the recent output symbol decisions ($A_{k-1}$, $A_{k-2}$, . . . , $A_{k-N}$, where N is the number of filter coefficients $F_i$). A set of multipliers determines the product of each symbol with a corresponding filter coefficient, and an summer arrangement combines the products to obtain the feedback signal. Where the short symbol intervals make it infeasible to implement the feedback filter 410, the decision element 408 may be modified into a precompensation unit to "unroll" one or more taps of the feedback filter, potentially eliminating the feedback filter entirely. The precompensation unit provides speculative decisions to a multiplexing arrangement as described in, e.g., U.S. Pat. No. 8,301,036 ("High-speed adaptive decision feedback equalizer") and U.S. Pat. No. 9,071,479 ("High-speed parallel decision feedback equalizer"), which are each incorporated herein by reference in their entireties.

As an aside, we note here that a timing recovery unit is typically included with any practical DFE implementation, but this consideration is addressed in the literature and generally known to those skilled in the art. Nevertheless we note here that at least some contemplated embodiments include one or more additional comparators to be employed for comparing the combined signal to one or more of the extreme symbol values (−3, +3), thereby providing an error polarity signal that can be used for timing recovery with, e.g., a "bang-bang" design.

The FFE filter 406 is an analog discrete-time FIR filter or, if preceded by an analog-to-digital converter, a digital discrete-time FIR filter. In either case, FFE filter 406 has adjustable tap coefficients. An error module 418 measures equalization error by subtracting the symbol decision for a given symbol interval from the value of the filtered signal for that symbol interval. In some variations, the error module 418 determines equalization error by subtracting the symbol decision from the equalized signal (i.e., the output of summer 408 rather than the output of filter 406) for that symbol interval. The error module 418 then correlates the equalization error with the symbol decisions to estimate residual ISI $R_i$:

$$R_i = \frac{E\{E_k A_{k-i}\}}{E\{A_{k-i}^2\}} \cong \frac{1}{JE\{A_k^2\}} \sum_{j=k-J+1}^{k} E_j A_{j-i}, \quad (1)$$

where $E\{x\}$ is the expected value, $E_k$ is the equalization error at time index k, and J is the length of a correlation measurement window. An adaptation module 420 adjusts the filter coefficients as discussed in greater detail below.

Figure 5:
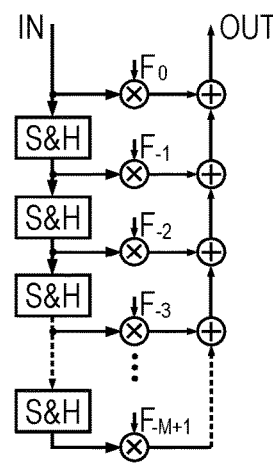
FIG. 5 is a block diagram of an illustrative discrete-time, finite impulse response ("FIR") filter.

FIG. 5 shows an illustrative implementation of an analog discrete-time FIR filter, which could be used for FFE filter 406. An input signal is supplied to a sequence of sample and hold ("S&H") elements. A first of the S&H elements captures the input signal value once in each symbol interval while outputting the captured value from the preceding symbol interval. Each of the other S&H elements captures the held value from the preceding element, repeating the operation to provide increasingly-delayed input signal values. A set of analog signal multipliers scales each of the input values in the sequence by corresponding coefficients $F_i$, supplying the scaled values to a summer that outputs the sum of the scaled input values. This weighted sum may be referred to herein as the filtered signal.

The FFE filter of FIG. 5 requires a large number of operations to be performed in each symbol interval, which becomes increasingly challenging as the symbol interval grows ever smaller. FIG. 6 accordingly provides a parallelized version of the FFE filter (with parallelized decision elements and feedback filters as well).

In FIG. 6, CTLE filter 404 bandlimits the receive signal before supplying it in parallel to an array of S&H elements. Each of the S&H elements is provided with a respective clock signal, each of the clock signals having a different phase, causing the elements in the array to take turns sampling the input signal. Only one of the S&H element outputs is transitioning at any given time. See FIG. 7 for an illustration of how the clock signals are shifted in phase relative to each other. Note that the duty cycle shown is merely illustrative; the point meant to be conveyed by the diagram is the sequential nature of transitions in the different clock signals.

An array of FFE filters (FFE0 through FFE7), each form a weighted sum of the S&H element outputs. The weighted sums employ filter coefficients that are cyclically shifted relative to each other. FFE0 operates on the held signals from the 3 S&H elements operating prior to CLK0, the S&H element responding to CLK0, and the 3 S&H elements operating subsequent to CLK0, such that during the assertion of CLK4, the weighted sum produced by FFE0 corresponds to the output of FFE filter 406 (FIGS. 4 and 5). FFE1 operates on the held signals from the 3 S&H elements operating prior to CLK1, the S&H element responding to CLK1, and the 3 S&H elements operating subsequent to CLK1, such that during the assertion of CLK5, the weighted sum corresponds to that of FFE filter 406. And the operation of the remaining FFE filters in the array follow the same pattern with the relevant phase shifts. In practice, the number of filter taps may be smaller, or the number of elements in the array may be larger, so as to offer a longer window of valid output.

As with the receiver of FIG. 4, a summer may combine the output of each FFE filter with a feedback signal to provide an equalized signal to a corresponding decision element. FIG. 6 shows an array of decision elements (Slicer0 through Slicer7), each operating on an equalized signal derived from a respective FFE filter output. As with the decision element 412 of FIG. 4, the illustrated decision elements employ comparators to determine which symbol the equalized signal most likely represents. The decisions are made while the respective FFE filter outputs are valid (e.g., Slicer0 operates while CLK4 is asserted, Slicer1 operates while CLK5 is asserted, etc.). The symbol decisions may be provided in parallel on an output bus to enable a lower clock rate to be used for subsequent on-chip operations.

An array of feedback filters (FBF0 through FBF7) operates on the preceding symbol decisions to provide the feedback signals for the summers. As with the FFE filters, the inputs for the feedback filters are shifted cyclically and provide a valid output only when the inputs correspond to the contents of the feedback filter 410 (FIG. 4), coinciding with the time window for the corresponding FFE filter. In practice, the number of feedback filter taps may be smaller than what is shown, or the number of array elements may be larger, so as to offer a longer window of valid output.

As with the decision element 412 of FIG. 4, the decision elements in FIG. 6 may each employ additional comparators to provide timing recovery info, coefficient training info, and/or precompensation to unroll one or more taps of the feedback filter. After accounting for the cyclic shifts, the same tap coefficients may be used for each of the FFE filters and for each of the feedback filters. Alternatively, the error module may separately calculate the residual ISI for each filter, enabling the adaptation module to adapt the tap coefficients of the separate filters independently.

The operation of the analog discrete-time filter components may be more susceptible to PVT variations than digital operations would be, and may benefit from the use of an improved adaptation process. The adaption module accordingly uses a perturbation effect based adaptation process to iteratively update the tap coefficients and thereby reduce the average residual ISI energy (mean square error). The adaptation module may combine a dynamic perturbation effect based update or gradient estimate with an update derived from a precalculated perturbation effect. The use of a precalculated perturbation effect estimator may provide a better starting point and faster convergence for the tap coefficient values, while the use of the dynamic perturbation effect based updates enables the equalizer performance to cope with PVT variations and may further prevent the adaptation process from getting trapped in a local, non-optimal minimum of the mean square error function. The dynamic effect and precalculated effect based updates may be combined using an interpolation process that optimizes the tradeoffs between the adaptation processes.

As an initial matter, we define $f_k$ as a column vector of FIR filter tap coefficients $[F_0, F_{-1}, F_{-2}, \ldots, F_{-M+1}]^T$ at time index k, where M is the number of tap coefficients. (T denotes transposition.) Define $r_k$ as a column vector of residual ISI measurements $[R_0, R_1, R_2, \ldots, R_{L-1}]^T$ at time index k, where L is the length of the residual ISI vector (L≥M).

Let W be a precalculated M×L perturbation effect matrix that projects the residual ISI vector to the M-dimensional space spanned by the tap coefficients; each row of the W matrix is the pulse response for the associated tap coefficient. Assuming the system is linear, each row of W can be precalculated by measuring the difference between a residual ISI vector with and without an offset applied to the value of the corresponding tap coefficient. (Note that W may depend on the channel transfer function and any correlation between transmitted symbols.) The precalculated perturbation effect based update at time index k becomes $Wr_k$, and the initial tap coefficient update equation is:

$$f_{k+1} = f_k - \mu W r_k, \qquad (2)$$

where µ is the update step size. Larger step sizes provide faster convergence, while smaller step sizes provide better performance. The step size can be varied gradually from large (perhaps about 0.2) to small (perhaps about $10^{-3}$) during the adaptation process to provide both benefits.

The foregoing coefficient update equation may be modified to include updates from a dynamic perturbation effect based gradient estimate. "Dynamic" is a term used here to indicate that the effects are determined as the equalizer is performing its intended function. The precalculated W matrix may be determined by the device designer or by the manufacturer during initial device configuration, i.e., not as part of the equalizer's normal operation.

Let $r_{k-S}^{i+}$ represent the residual ISI column vector at time index k-S measured with the ith tap coefficient value perturbed upward (increased by a predetermined amount Q), and $r_k^{i-}$ represent the residual ISI vector at time index k measured with the ith tap coefficient value perturbed downward (decreased by the same predetermined amount Q), where S is the time interval between the upward and downward perturbations. (Though the interval S between perturbations can be larger, the perturbation need not be applied for a duration any greater than the length J of the residual ISI measurement window.) If Q is kept small (perhaps about the size represented by the least significant bit), the effect of the perturbations on the symbol error rate is negligible. The dynamic perturbation effect based gradient estimate for the ith tap coefficient may be expressed in terms of the difference in the residual ISI energy (mean square residual ISI error):

$$G_k^i = ([r_{k-S}^{i+}]^T r_{k-S}^{i+} - [r_k^{i-}]^T r_k^{i-})/2Q \qquad (3)$$

As the perturbations are performed individually, the gradients for each coefficient may be calculated in sequence, such that the "instantaneous" perturbation effect based gradient estimate vector g becomes:

$$g_k = [G_k^0, G_{k-2S}^1, G_{k-4S}^2, \ldots, G_{k-2(M-1)S}^{M-1}]^T. \qquad (4)$$

To reduce noise, the current estimate may be combined with previous estimates. Various filter designs would be suitable, including a "leaky" average with a recursive forgetting factor α:

$$\hat{g}_k = \alpha \hat{g}_{k-2MS} + (1-\alpha) g_k. \qquad (5)$$

The forgetting factor has a value between zero and one, and may be chosen to provide a trade off between noise and error tracking bandwidth. Larger values reduce noise, but reduce the bandwidth for tracking changes to the system.

Tap coefficient update equation (2) can be modified to include the dynamic perturbation effect based gradient estimate using an interpolation factor β between zero and one, inclusive:

$$f_k = f_{k-2MS} - \mu((1-\beta)Wr_k + \beta \hat{g}_k). \qquad (6)$$

If β is zero, the update is purely based on the precalculated perturbation effect, whereas if it is one, the update is purely based on the dynamically determined perturbation effect. The interpolation factor may be dynamically adjusted to emphasize one over the other, perhaps emphasizing the dynamic perturbation effect based updates as the device temperature increases or as the supply voltage deviates from a nominal value.

To reduce multiplications, a "looser" dynamic perturbation effect based update calculation approach can be used. The dynamic perturbation effect may be measured using a residual ISI difference vector:

$$d_k^i = (r_{k-S}^{i+} - r_k^{i-})/2Q. \qquad (7)$$

The difference vectors for the different tap coefficients can be stacked to form an "instantaneous" difference matrix having the same size as the precalculated W matrix:

$$D_k = [d_k^0, d_{k-2S}^1, d_{k-4S}^2, \ldots, d_{k-2(M-1)S}^{M-1}]^T. \qquad (8)$$

As before, a leaky average may be used to reduce noise:

$$\hat{D}_k = \alpha \hat{D}_{k-2MS} + (1-\alpha) D_k. \qquad (9)$$

This filtered difference matrix can be interpolated with the weighting matrix W before the residual ISI vector multiplication, yielding a coefficient update that is interpolated between that of the precalculated perturbation effect based update and that of a dynamic perturbation effect based update. Thus, the tap coefficient update equation (2) can be expressed:

$$f_k = f_{k-2MS} - \mu((1-\beta)W + \beta \hat{D}_k) r_k. \qquad (10)$$

Note, however, the potential for performing the update calculation on a coefficient by coefficient basis, as it is not necessary for all tap coefficients to be updated simultaneously:

$$[F_{1-i}]_k = [F_{1-i}]_{k-2MS} - \mu((1-\beta)w^i + \beta[\hat{d}_k^i]^T) r_k, \qquad (11)$$

where $w^i$ is the ith row of the precalculated W matrix and $[\hat{d}_k^i]^T$ is the ith row of the filtered difference matrix.

The interval S between perturbations can be chosen to provide sufficient measurements in each window to assure the system adequately tracks temperature and voltage variations, thereby minimizing error rate over the full operating envelope of the integrated circuit.

Figure 8:
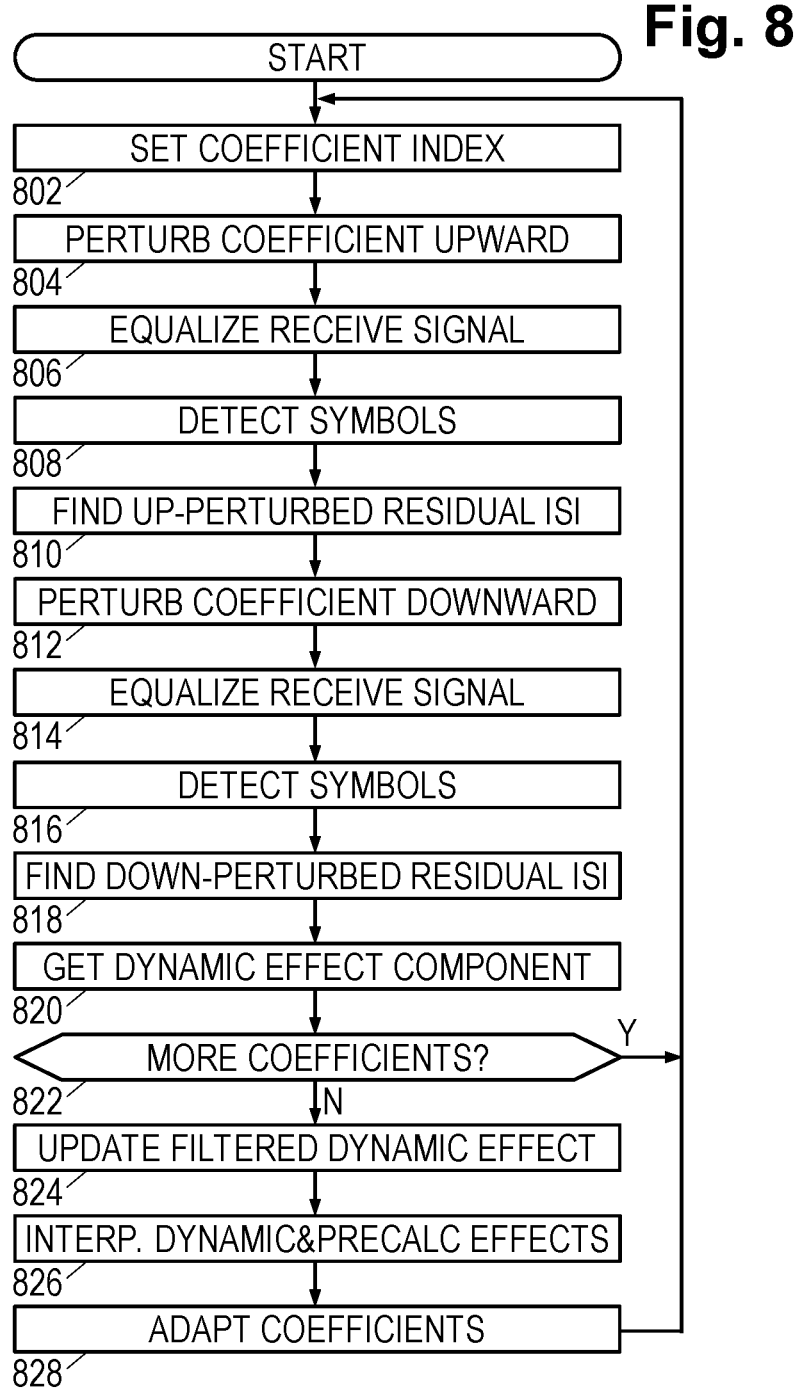
FIG. 8 is a flow diagram of an illustrative equalization method.

The adaptation module may be a programmable signal processor or application-specific integrated circuitry designed to determine and apply the tap coefficient updates. The functionality of the error module may be merged with the adaptation module or their functions apportioned differently between the modules. FIG. 8 is a flow diagram of an equalization method that may be implemented by an equalizer having such an adaptation module.

As equalizer operations begin, potentially after the tap coefficients have been set to initial default values, the adaptation module selects an initial coefficient index in block 802 and perturbs that tap coefficient value upwardly by a predetermined amount Q in block 804. The perturbed tap coefficient is used by the equalizer in block 806 to convert a receive signal into a filtered signal and in block 808 to detect the symbols represented by the filtered signal. In block 810, an error module subtracts the symbol decisions from the filtered signal to obtain the equalization error, from which the up-perturbed residual ISI $r_k^{i+}$ is determined. In block 812, the adaptation module perturbs the tap coefficient downwardly by the predetermined amount Q. The perturbed tap coefficient is again used by the equalizer in block 814 to convert a receive signal into a filtered signal and in block 816 to detect the symbols represented by the filtered signal. In block 818, the error module subtracts the symbol decisions from the filtered signal to obtain the equalization error, which is combined with the symbol decisions to obtain the down-perturbed residual ISI $r_k^{i-}$. In block 820, the adaptation module combines the up-perturbed residual ISI with the down-perturbed residual ISI (e.g., using equation (3) or (7)) to obtain an instantaneous dynamic perturbation effect component of the gradient estimate vector or dynamic perturbation effect row of the difference matrix.

In block 822, the adaptation module determines whether the gradient vector components or difference matrix rows have been determined for each of the tap coefficients, and if not, returns to block 802 to update the tap coefficient index and repeat blocks 804-822. Once all of the gradient vector components or difference matrix rows have been determined, the adaptation module updates the filtered gradient vector estimate or filtered difference matrix in block 824, e.g., using equation (5) or (9). In block 826, the adaptation filter interpolates between precalculated and dynamic perturbation effect based updates, and in block 828, the adaptation filter adjusts the tap coefficients accordingly. The adaptation module then repeats the entire process to enable performance optimization over variations of temperature and supply voltage.

Numerous alternative forms, equivalents, and modifications will become apparent to those skilled in the art once the above disclosure is fully appreciated. For example, dynamic perturbation effects can be measured using perturbed and unperturbed coefficient values rather than up- and down-perturbed coefficient values, and it's possible to perturb more than one coefficient value at a time so long as the individual coefficient perturbation effects can be algebraically or statistically distinguished. Though the foregoing description uses a DFE for illustration, the principles are applicable to all equalizers including a discrete-time FIR filter, e.g., linear equalizers and partial response equalizers, and for all signal constellations including bipolar non-return to zero (NRZ) signaling and higher-order pulse amplitude modulation. The order of operations described in the flow diagram and shown in the equations can be varied, with certain operations being reordered, pipelined and/or performed in parallel. It is intended that the claims be interpreted to embrace all such alternative forms, equivalents, and modifications where applicable.

What is claimed is:

1. An equalizer that comprises:
a discrete-time, finite impulse response ("FIR") filter to convert an input signal to a filtered signal;
a decision element to determine channel symbols represented by the filtered signal;
an error module to measure, based in part on the channel symbols, residual intersymbol interference ("ISI") associated with the filtered signal; and
an adaptation module to determine dynamic effects of filter tap coefficient perturbations on the residual ISI and to determine updates for tap coefficients of the filter based on the dynamic effects, the perturbations including upward perturbations and downward perturbations, and each of the updates combining the dynamic effect associated with an upward perturbation of a given tap coefficient with the dynamic effect associated with a downward perturbation of that given tap coefficient.

2. The equalizer of claim 1, wherein the adaptation module determines the tap coefficient updates by combining the dynamic effects with precalculated effects of filter tap coefficient perturbations on the residual ISI.

3. The equalizer of claim 1, wherein the adaptation module iterates systematically through the tap coefficients to determine the dynamic effect associated with each individual tap coefficient.

4. The equalizer of claim 1, wherein the dynamic effects are determined as a combination of a current and previous estimates.

5. The equalizer of claim 4, wherein the adaptation module determines the dynamic effects using a recursive forgetting factor.

6. The equalizer of claim 1, wherein the adaptation module is configured to derive a perturbation-based error gradient estimate from the effects.

7. The equalizer of claim 1, wherein the decision element includes a decision feedback precompensation unit.

8. The equalizer of claim 1, further comprising:
a feedback filter to convert the channel symbols into a feedback signal; and
a summer that combines the feedback signal with the filtered signal to provide the decision element with an equalized signal.

9. An equalization method that comprises:
converting an input signal to a filtered signal using a discrete-time, finite impulse response ("FIR") filter;
using a decision element to determine channel symbols represented by the filtered signal;
measuring, based in part on the channel symbols, residual intersymbol interference ("ISI") associated with the filtered signal;
perturbing tap coefficients of the filter to determine dynamic effects on the residual ISI, said perturbing including providing upward perturbations and downward perturbations; and
updating the tap coefficients based on the dynamic effects, said updating including combining a dynamic effect associated with an upward perturbation of a given tap coefficient with a dynamic effect associated with a downward perturbation of that given tap coefficient.

10. The equalization method of claim 9, wherein the updating includes combining the dynamic effects with precalculated effects of tap coefficient perturbations on the residual ISI.

11. The equalization method of claim 9, wherein the dynamic effects are expressible as a vector or matrix of differences in residual ISI measurements.

12. The equalization method of claim 9, wherein the dynamic effects are expressible as a vector of differences in residual ISI energy measurements.

13. The equalization method of claim 9, wherein the dynamic effects are determined as a combination of a current and previous estimates.

14. The equalization method of claim 13, wherein the combination uses a recursive forgetting factor.

15. An equalization method that comprises:
providing a discrete-time, finite impulse response ("FIR") filter to convert an input signal to a filtered signal;
configuring a decision element to determine channel symbols represented by the filtered signal;

coupling the channel symbols to an error module to measure residual intersymbol interference ("ISI") associated with the filtered signal; and providing an adaptation module to determine dynamic effects of filter tap coefficient perturbations on the residual ISI and to derive updates for tap coefficients of the filter from the dynamic effects, wherein said adaptation module is configured to provide upward perturbations and downward perturbations of the tap coefficients, and each of the updates combines a dynamic effect associated with an upward perturbation of a given tap coefficient with a dynamic effect associated with a downward perturbation of that given tap coefficient.

16. The equalization method of claim 15, wherein the adaptation module is configured to determine tap coefficient updates by combining the dynamic effects with precalculated effects of filter tap coefficient perturbations on the residual ISI.

17. The equalization method of claim 15, wherein the dynamic effects are expressible as a vector or matrix of differences in residual ISI measurements.

18. The equalization method of claim 15, wherein the dynamic effects are expressible as a vector of differences in residual ISI energy measurements.

* * * * *